March 21, 1933.  F. RIEBER  1,902,265

ELECTRICAL PROSPECTING SYSTEM

Filed Feb. 3, 1930   2 Sheets-Sheet 1

INVENTOR.
FRANK RIEBER
BY
ATTORNEY

Patented Mar. 21, 1933

1,902,265

UNITED STATES PATENT OFFICE

FRANK RIEBER, OF BERKELEY, CALIFORNIA, ASSIGNOR TO FRANK RIEBER, INC., OF SAN FRANCISCO, CALIFORNIA, A CORPORATION OF CALIFORNIA

ELECTRICAL PROSPECTING SYSTEM

Application filed February 3, 1930. Serial No. 425,631.

My invention relates to electrical prospecting, and its broad purpose is to provide a method of detecting anomalies in earth conductivity, i. e., of detecting the presence of strata or other geological formations having a conductivity different from that of the surrounding formation.

Objects of my invention are: To provide a method of determining the distribution of earth conductivity which will disclose the presence of formations having either higher or lower conductivity than the surrounding formation, which will differentiate between surface or shallow conductivity and higher conductivity in deeper layers; a method which utilizes the vertical component of earth current to avoid masking of deep effects by shallower ones; and one which requires a minimal amount of apparatus, and is simple, easy, and accurate in its application. Another object of my invention is to provide suitable apparatus for the practice of my method.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Commercially valuable minerals ordinarily differ greatly in electrical conductivity from the relatively valueless material with which they are surrounded. This is true whether the valuable material be petroleum, which is almost a perfect insulator, or metallic ore, whose conductivity is many times greater than the rock by which it is surrounded. Electrical prospecting methods take advantage of these facts by passing an electrical current thru the earth and attempting to map the paths taken by the earth current. The mapping may be done either by means of inductive effect, or by magnetometer, but in either case the medium thru which the mapping is accomplished is the magnetic field of the earth current. There is also a method of mapping by the surface distribution of potential between the electrodes.

Past practice has been to pass the earth current by induction, conduction, or a combination of the two, and to conduct an instrumental survey over the area carrying the ground current. The interpretation of the electric survey is a tedious and uncertain process. The surface layers of the earth, carrying ground water in which more or less electrolytic salt is dissolved, carry a greater portion of the earth current, and therefore provide a relatively strong magnetic field which tends to mask the field produced by anomalies in the deeper layers. Not only are these surface currents stronger, but being closer to the surveying instrument they have a more concentrated field at the point of measurement, and therefore the irregularities in conductivity in which the observer is interested appear as extremely minute second order effects.

The method of my invention, as considered broadly, also includes the step of passing a current thru the earth, preferably conductively thru a pair of grounded electrodes. The magnetic field between the electrodes is not mapped however, but instead magnetometric readings are taken beyond the line joining the points at which the current enters and leaves the earth, and preferably on an extension of this line. At such a point, the substantially horizontal current flowing in the surface layers of the earth contribute practically nothing to the magnetic field. The vertical components of the earth current, penetrating to the deeper layers, are responsible for practically the entire magnetic field, and particularly its horizontal component. In making the survey, the earth's own magnetic field is balanced out, the earth currents being preferably alternating curents of low frequency.

In order to measure the magnetic field with a high degree of accuracy a nul method of reading is preferably used. A current of the same character as that passing thru the earth and having a known ratio thereto is passed thru a coil to produce a known magnetic field. A magnetometer mounted at the position at which the readings are to be taken, and resonant to the frequency of the alternating current used, indicates the strength of the resultant magnetic field. The known field is then varied, preferably by changing the position of the coil, until the magnetometer ceases to give an indication. The strength of the field of the earth current may thus be plotted, either in absolute units, or as a function of the position of the coil, at a plurality of points. From a sufficient number of such plots the distribution of the earth's conductivity may be inferred with a greater degree of accuracy than has been possible by former methods.

Referring to the drawings.

Figure 1:
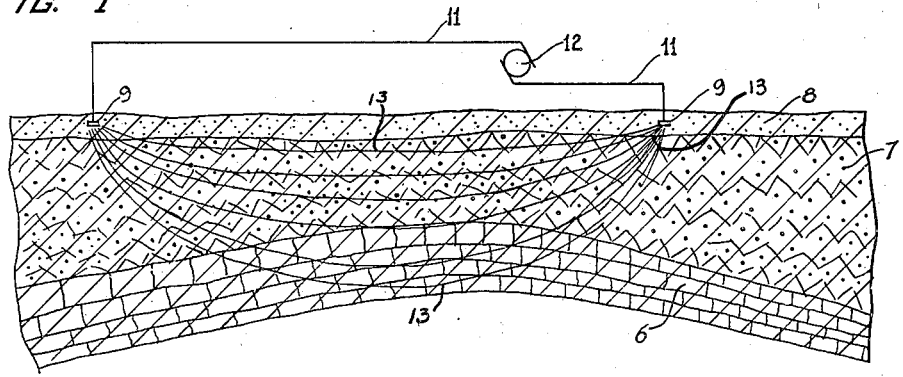
Figure 1 represents in diagrammatic form the circuit used for establishing the earth current, and indicates the current paths where no anomalies of conductivity exist.
Figure 2:
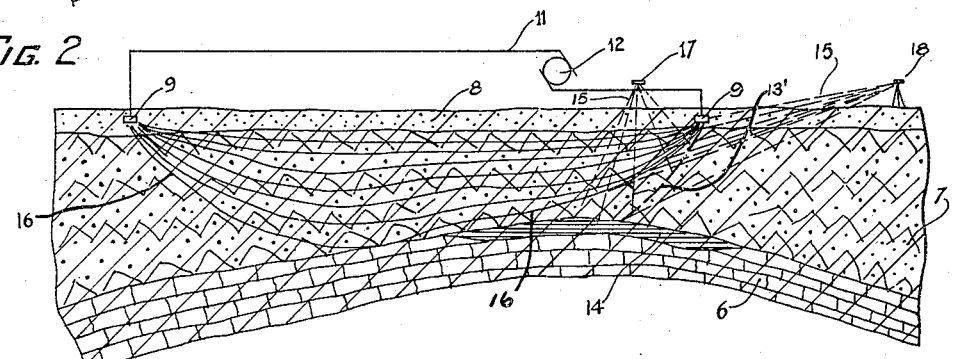
Figure 2 is a similar diagram indicating the current paths as deflected by a nonconducting stratum such as an oil-bearing layer. This view also indicates the lines of influence affecting a magnetometer as placed between the electrodes, as in the ordinary methods, and as placed in my method.

The detailed operation of my system can best be understood by a comparison of Figures 1 and 2. Each of these figures represents a cross section of a portion of the earth's surface layers, showing underlying strata 6, carrying an overburden 7 surmounted by a surface layer 8 which carries a major amount of surface moisture. Buried in the surface layer are electrodes 9 connected by a circuit 11 which includes a suitable generator or current source 12.

The source 12 may be a direct current generator or storage battery, but is preferably a source of low frequency alternating current. In practice a convenient source is a storage battery which supplies its current thru a small motor-driven commutator operating at a frequency of from ½ cycle per second to perhaps 20 cycles per second. The metallic conductor 11 is shown as spaced from the earth's surface, but in practice is usually an insulated cable laid directly upon the ground.

The light lines 13 of Figure 1 indicate roughly some of the current paths between the two electrodes 9. The lines 13 should not be understood as indicating current density, but merely as indicating the general direction of the current paths. The current will so divide itself that paths of equal conductivity will carry equal currents. Thus a short path of small cross section will carry the same total current as a longer path of greater cross section, or, in other words, the current density along any path will be inversely proportional to its length multiplied by its specific resistance.

Where the underlying strata carry materials having a markedly different conductivity from the surrounding structure, the current paths will be distorted. This is illustrated in Figure 2, where the reference character 14 indicates an oil-bearing structure whose conductivity is extremely low. In this case the effective current paths 16 are deflected upward, particularly over the oil-bearing layer. This deflection is shown by comparison with the dotted line 13′ which indicates the general outline of the current paths in a normally conductive medium.

In the ordinary system of magnetometric surveying the magnetometer 17 would be placed between the electrodes 9 as shown. The resultant field at this point is due to the integrated effects of all of the current paths. The field due to any single path is perpendicular to the path and is proportional to the integral of the expression $$\frac{I \sin a \, dl}{h^2},$$

where $I$ is the current in the individual path, $dl$ is the element of path length, and $a$ is the angle between the element $dl$ and the line (whose length is $h$), joining it with the magnetometer. These lines are indicated in the drawings by the reference character 15, and referred to as "lines of influence." For any given path $a$ varies along the path in accordance with its shape. For circuits of the physical dimensions of those here considered, only those portions closest to the magnetometer have an appreciable effect on the field.

It will be apparent from an inspection of this formula that the field at the position of the magnetometer 17 is predominately due to the surface current immediately beneath the instrument. To an instrument at this position the deeply penetrating vertical components of current have little effect, since $h$ is large and the angle $a$ is very small. For these reasons it is very difficult to differentiate between current paths 16 and those as shown at 13 or 13′.

In the system of my invention, a magnetometer 18, arranged to measure the horizontal component of the magnetic field, is placed beyond the line joining the electrode 9—9, and preferably upon an extension of this line. At the position where the magnetometer 18 is shown, the horizontal components of the current have practically zero effect, owing to the very small magnitude of the angle $a$ at this point. The vertical components of the current have, on the contrary, a predominating effect, and where the conditions shown in Figure 2 obtain a relatively large change in reading will result, since the angle $a$ is decreased and the distance $h$ is increased by the distortion of the current paths. The net effect is that whereas the magnetometer 17 is affected almost wholly by horizontal current, the magnetometer 18 is responsive to the vertical components of the earth current, and hence is peculiarly adapted to show the distribution of conductivity in the lower structure.

Figure 3:
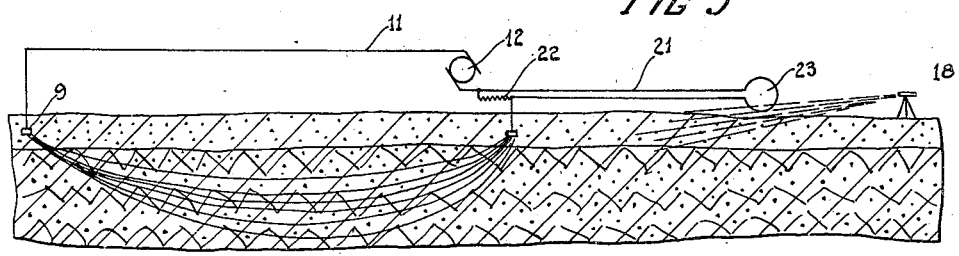
Figure 3 is a diagrammatic view indicating the method of using a portion of the earth current to establish a known magnetic field.

While the set-up of Figure 2 may be used to give practical results, more accurate and easily reproducible readings can be taken with the circuit arrangement shown diagrammatically in Figure 3. Here a derived circuit 21 branches from the earth circuit 11, a resistance 22 being bridged across the circuit 21 so that a predetermined portion of the current in the earth circuit flows in circuit 21. This current flows thru a coil 23 of known dimensions. The circuit 21 is preferably carried in a twisted pair so that its net exterior magnetic effect is solely that due to the coil 23.

The relative positions of the electrode 9, the coil 23, and the magnetometer 18, are carefully surveyed, so that the magnetic effect of the coil 23 upon the magnetometer is accurately determinable. The known field of the coil 23 is then varied until it is exactly equal and opposite to that produced by the earth current. This may be done by varying the value of the resistance 22, or by moving the coil 23 until the balance is obtained.

Figures 4, 5:
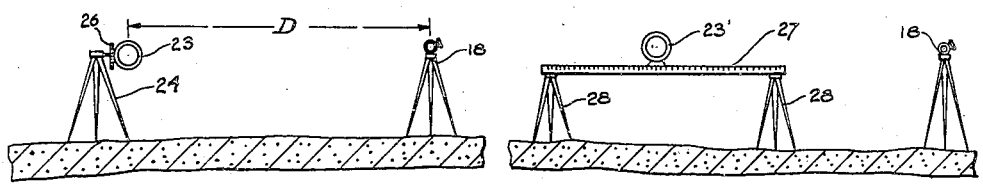
Figures 4 and 5 show the arrangement, relative to the magnetometer, of two forms of adjustable position coils.

Two methods of obtaining the balance by the latter method are shown in Figures 4 and 5. In the arrangement shown in Figure 4, the coil 23 is mounted on a tripod 24 at a predetermined distance D from the magnetometer 18. The coil is rotatable about a horizontal axis, and its angle from the vertical may be read upon a vertical circle 26 forming a part of the instrument. Since the magnetometer is designed to read the horizontal component of the magnetic field only, the strength of this component is proportional to the cosine of the angle of coil position as read upon the vertical circle.

In the alternative arrangement shown in Figure 5 the coil 23′ is mounted upon a horizontal scale 27 carried by two tripods 28. In this case the plane of the coil remains fixed, and the effect of the coil upon the magnetometer depends upon its position on the scale 27. As in the previous case the position of the coil is varied until a zero reading is obtained from the magnetometer 18.

Figure 7:
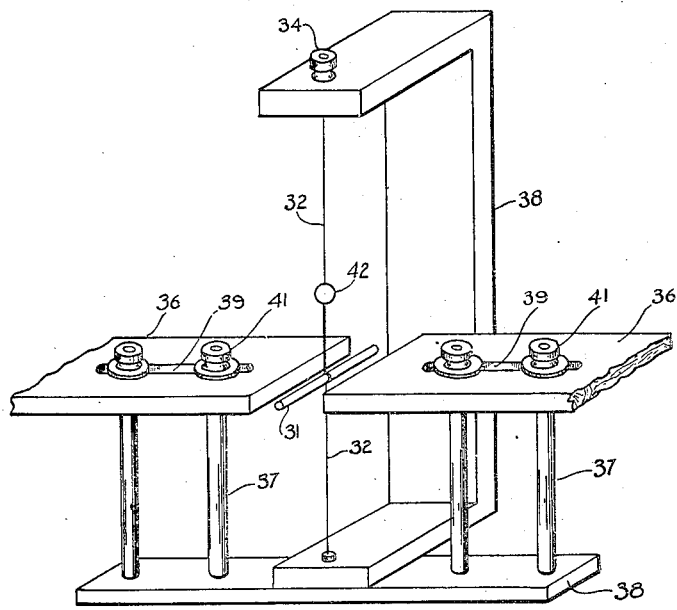
Figure 7 is a perspective view, showing the essential parts of a sensitive tuned magnetometer which requires no electrical amplifier and which is suitable for use with the method of my invention.

In order that an extremely accurate balance between the earth field and the known field may be obtained, it is advisable to use a tuned magnetometer resonant to the frequency to the earth current. The elements of one form of such a device are shown in Figure 7. A magnetic needle 31 is carried upon a double ligament suspension 32 by a U-shaped support member 33, the tension on the ligament being adjustable by a suitable screw 34. The effect of the earth's magnetic field upon the needle may be balanced out magnetically, or may be compensated by twisting the ligament 32.

A pair of pole pieces 36, preferably formed of permalloy or other highly permeable material, are mounted upon the studs 37 carried by a sub-support 38. The studs pass thru slots 39 formed in the pole pieces, and carry thumb-nuts 41 permitting adjustment of the air gap. A narrow gap increases the sensitivity of the instrument but tends to make it unstable.

The pole pieces 36 serve to concentrate the magnetic field upon the magnet 31, and greatly increase the sensitivity of the device as is explained by me in Technical Publication 119—L—1, American Institute of Mining and Metallurgical Engineers, February 19, 1928, and in my copending application Serial No. 244,507, filed Jan. 4, 1928. When the instrument is subjected to a magnetic field in the direction of extension of the pole pieces, a couple is produced upon the needle 31 which tends to cause its rotation. When the field alternates at the period to which the magnet naturally oscillates, a vibration will be built up whose amplitude depends upon the strength of the alternating field and upon the damping of the magnet. Since the latter quantity is extremely small the device is very sensitive. The sensitivity can, of course, be increased by mounting it in a vacuum, but the additional complication is not ordinarily warranted.

A mirror 42 is mounted upon the ligament 32, and the amplitude of vibration of the magnet can be determined by viewing this mirror with telescope and scale in the manner which is familiar thru its well known use in galvanometer practice.

It will be noted that the effect of the earth's permanent magnetic field is balanced out in this device thru the fact that alternating current is used, and that it is only the alternating field which affects amplitude of oscillation. It is frequently advisable however, to use a permanent magnet whose field substantially neutralizes that of the earth in order to prevent saturation effect in the highly permeable pole pieces 36.

Figure 6:
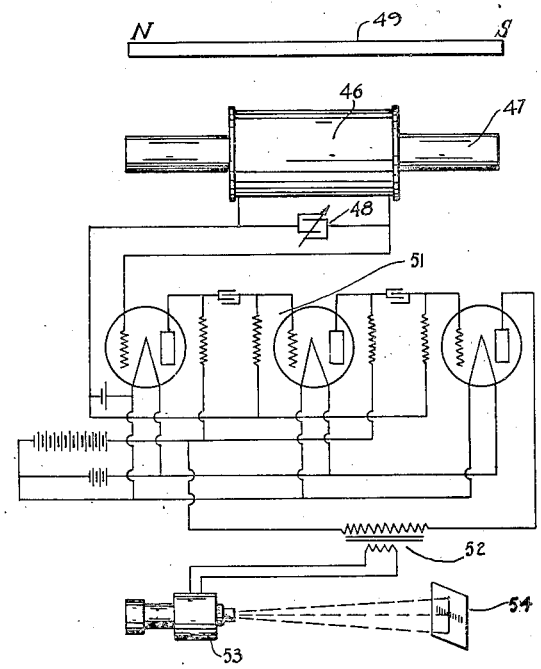
Figure 6 is a circuit diagram showing a form of tuned magnetometer using an amplifier circuit with a string galvanometer as an indicator.

An alternative form of magnetometer is shown in Figure 6. This type of device is particularly applicable where alternations of higher frequencies than those used in the preceding case are utilized. A coil 46 surrounds a highly permeable core 47 and is tuned to the frequency of alternation used by a condenser 48. The core 47 is mounted in the direction in which it is desired to measure the alternating magnetic field, and a bar magnet 49 is preferably mounted adjacent the core 47 to balance out the permanent magnetic field of the earth. The coil 46 is connected across the filament and grid of a conventional type of amplifier 51, which is here shown as resistance coupled, but which may also be tuned to the frequency of the current used in the earth circuit if desired. The output circuit of this amplifier connects thru a transformer 52 to a string galvanometer 53, which projects its reading upon a suitable scale 54. By tuning each of the circuits and the string to the proper frequency, a device of greater sensitivity and selectivity may be obtained.

It is to be noted that for ordinary magnetometric work the type of magnetometer shown in Figure 7 is the more useful. In this case the frequency of alternation used in the earth circuit is so low that inductive effects and phase rotation due thereto may be neglected. Where alternating currents of higher frequency are used, the magnetometer of Figure 6 is more practical, but it is essential in using this device that care be taken to use the proper phase relationship as regards circuits 11 and 21 as otherwise it may be impossible to obtain a nul.

Although it may be possible to use waves of radio frequency with my system of electrical prospecting, the difficulties arising would normally prevent such frequencies being used. Where the frequencies utilized are within the audible limit, the distances separating the earth circuit and the magnetometer are so small in comparison with the wave length that phase differences due to this factor may be neglected.

Although I have shown my system as used for determining the presence of a non-conducting body, it will be realized that it is also applicable to prospecting for metallic ores whose conductivity is large in comparison with the surrounding structure. In this case the effect on the magnetometer 18 is to increase instead of decrease its readings.

As in all electrical prospecting systems, the depth to which an appreciable quantity of earth current penetrates is dependent upon the separation of the electrodes 9. Where deep structures are to be investigated these electrodes must be widely separated; for shallower structures they may be placed closer together. It will also be recognized that the greater the distance between the earth circuit and the magnetometer 18, the greater will be the relative effect of the deeper portion of the earth currents. The absolute effect of these currents varies, of course, in accordance with the inverse square law, and therefore the position of the instrument is a compromise.

The preferred method of survey is to take a series of readings at varying spacings between the magnetometer and earth circuit, and then move the electrodes to a new position and repeat the operation.

I claim:
1. The method of determining the distribution of earth conductivity which comprises the steps of passing a current between points on the earth's surface, and measuring the vertical component of said current within the earth.
2. The method of determining the distribution of earth conductivity which comprises the steps of passing a current between points on the earth's surface, and measuring the vertical component of said current within the earth by evaluating the strength of the magnetic field of said component.
3. The method of determining the distribution of earth conductivity which comprises the steps of passing a current between points on the earth's surface, and measuring the horizontal component of the resultant magnetic field at a position beyond a line connecting said points.
4. The method of determining the distribution of earth conductivity which comprises the steps of passing a current between points on the earth's surface, and measuring the horizontal component of the resultant magnetic field at a position on an extension of the line connecting said points.
5. The method of determining the distribution of earth conductivity which comprises the steps of passing a current between a pair of points on the earth's surface, utilizing a current having a known ratio to said earth current to produce a magnetic field of known relative intensity, and evaluating the vertical component of the current within the earth by varying the known magnetic field to balance the field of said vertical component.
6. The method of determining the distribution of earth conductivity which comprises the steps of passing a current between a pair of points on the earth's surface, utilizing a current having a known ratio to said earth current to produce a magnetic field of known relative intensity, and varying the known magnetic field to balance the horizontal magnetic field produced by the earth current at a position beyond the line joining the points at which it enters and leaves the earth.

7. The method of determining the distribution of earth conductivity which comprises the steps of passing a current between a pair of points on the earth's surface, utilizing a current having a known ratio to said earth current to produce a magnetic field of known relative intensity, and varying the known magnetic field to balance the horizontal magnetic field produced by the earth current at a position on an extension of the line joining the points at which it enters and leaves the earth.

8. The method of determining the distribution of earth conductivity which comprises the steps of passing a current between a pair of points on the earth's surface, utilizing a current having a known ratio to said earth current to produce a magnetic field of known relative intensity, and varying the position of the known magnetic field to balance the horizontal magnetic field produced by the earth current at a position on an extension of the line joining the points at which it enters and leaves the earth.

In testimony whereof, I have hereunto set my hand.

FRANK RIEBER.